3,324,206
METHOD OF FORMING HIGH ENERGY SOLID FUEL GRAIN FOR A ROCKET

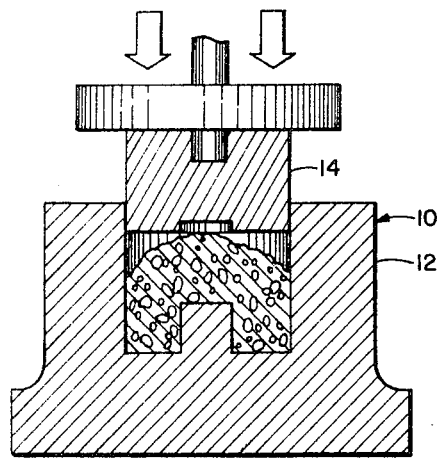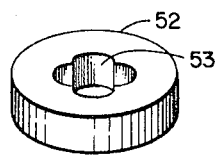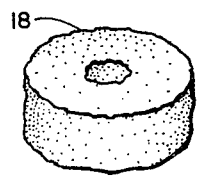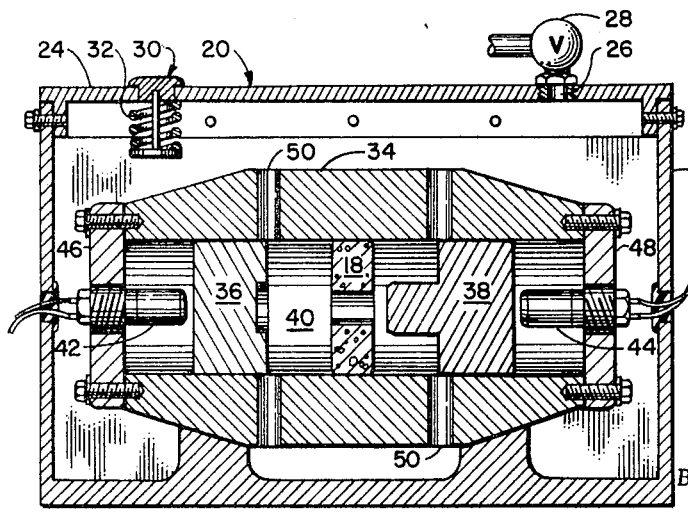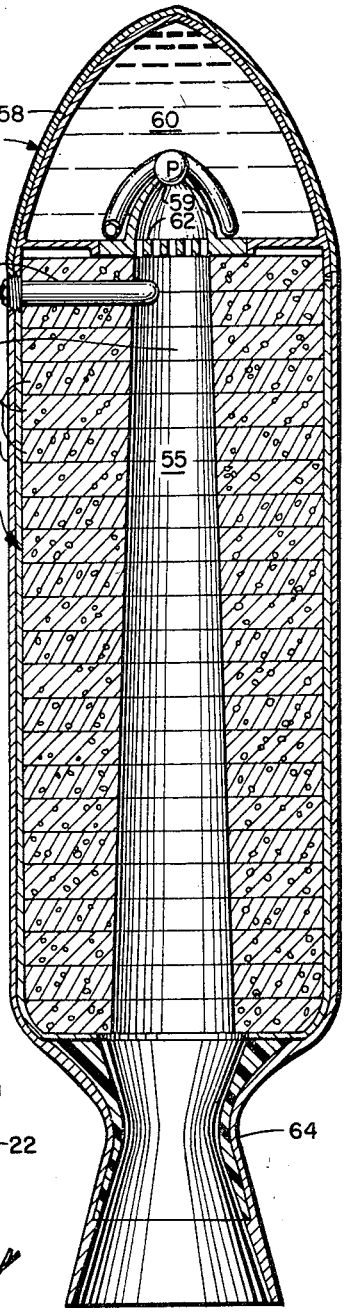
FIG.-1
FIG.-4
FIG.-2
FIG.-3
FIG.-5
INVENTORS
IRVING LIEBERMAN
LOUIS ZERNOW
BY Edward O. Ansell
William E. Hiller
ATTORNEYS

Irving Lieberman, Covina, and Louis Zernow, Downey, Calif., assignors to Aerojet-General Corporation, Azusa, Calif., a corporation of Ohio
Original application Oct. 23, 1961, Ser. No. 146,755, now Patent No. 3,274,771, dated Sept. 27, 1966. Divided and this application June 16, 1966, Ser. No. 567,028
6 Claims. (Cl. 264—3)

This is a division of our copending application, Ser. No. 146,755, filed Oct. 23, 1961, now Patent No. 3,274,771.

This invention relates to rockets and to methods of fabricating high energy solid fuel grains for rockets.

The increasing requirements for higher performance and reliability in rockets has turned the attention of designers to solid fuel or hybrid rockets utilizing high energy propellants. In the examination of propellant possibilities, many theoretically desirable propellant combinations have had to be discarded because the desired chemicals could not be formed into a suitable shape with a sufficient high density.

The metal hydrides, such as lithium hydride and titanium hydride or mixtures of these hydrides with or without a metal such as aluminum or lead are in a group of chemicals which are chemically desirable as a propellant component but the use of these chemicals was heretofore not considered feasible. This was because of problems in shaping them property and because it was not previously possible to form these chemicals to a sufficiently high density. Low density in a solid fuel grain was objectionable because in addition to the low density having an adverse effect on the structural integrity of the fuel grain, the rocket casing had to be larger and heavier to accommodate the larger less dense fuel grain. This adversely affected the mass ratio and performance of the rocket.

The object of this invention is to provide a method of fabricating high density compacts of powdered metal hydrides.

The invention in its broadest aspects comprises preforming the metal hydride mixture to its approximate shape by inserting the powdered metal hydride mixture in a female die and pressing it therein. Next the preformed material is placed in a second female die (preferably in an evacuated chamber) then a male die member is explosively driven into the female die member. This operation forms a precisely shaped high density compact of the metal hydride.

Other objects of this invention will become more apparent when read in the light of the accompanying drawings and specification wherein:

FIG. 1 discloses a powdered metal hydride being initially compressed in a conventional female die by a hydraulically driven male die member;

FIG. 2 is a perspective view of the fuel grain after it has been roughly preformed by the apparatus shown in FIG. 1;

FIG. 3 discloses a cross-sectional view of explosively driven male die members movable in a guide member inside of an evacuated chamber for completing the formation of the high density metal hydride campacts;

FIG. 4 is a perspective view of one possible configuration of a metal hydride compact segment formed by the operation of the apparatus shown in FIG. 3; and FIG. 5 is a cross-sectional view of a hybrid rocket wherein the fuel grain is formed from stacked layers of metal hydride compacts.

Referring now to FIG. 1 the method of forming a solid fuel grain for a rocket from a metal hydride preferably utilizes a preliminary preforming apparatus indicated generally by the reference numeral 10. This apparatus includes a female die 12 and a male die 14. The male die member 14 is actuated by a suitable hydraulic mechanism not shown. With this arrangement, a powdered metal hydride mixture such as lithium hydride, titanium hydride, or a mixture of the two with or without metal such as powdered aluminum or lead, is inserted in the female die 12. Next male die 14, urged on by hydraulic pressure, compresses the powdered metal hydride mixture into a preliminary or rough shape 18 as shown in FIG. 2. Because of the physical properties of the metal hydride mixture the preformed compact resulting from this initial preforming operation is unsatisfactory for use as a solid fuel grain because of irregularities in its configuration and because of its low and nonuniform density. If the preformed metal hydride compact shown in FIG. 2 were used as a fuel grain its lower density would require the casing of the rocket motor to be larger and heavier than would otherwise be required. In addition, the low and nonuniform density of the material of the metal hydride would produce unstable variations in the combustion processes.

To make the metal hydride compact shown in FIG. 2 more suitable for use as a solid fuel grain, the preformed metal hydride compact 18 is then inserted in the apparatus indicated generally by the reference numeral 20 and shown in FIG. 3. This apparatus includes a housing 22 with a removable closure 24. This closure is provided with an outlet tube 26 which is adapted to be connected to an evacuation pump (not shown) through a control valve 28. In addition, for reasons to become apparent below, the closure member is provided with a pressure relief valve 30 which is normally biased to a valve closed condition by means of valve spring 32.

A combined cylinder and female die member 34 is removably mounted inside housing 20. The rough shaped or preformed metal hydride compact 18 is positioned between opposed movable pistons or male die members 36 and 38. These male die members move inside opening 40 in the female die member 34. Explosives 42 and 44 are removably mounted in closure plates 46 and 48 which are in turn removably attached by any suitable means to the ends of the opening 40 in the female die member 34. With this arrangement, the detonation of the explosives 42 and 44 forces the male die members toward each other with explosive violence. The gases generated by the detonation leave the female die member 34 through vents 50 formed therein, and the sudden increase in pressure inside housing 22 lifts the pressure release valve 30 permitting the gases in the housing 22 to escape.

The force exerted on the male die members 36 and 38 by the detonation of the explosives compresses the preformed metal hydride compact to its final shape 52 (see FIGURE 4). It is to be understood, however, that although the metal hydride compact 52 is shown as cylindrical with a generally star-shaped opening 53 extending therethrough, the compact can be formed in any desired shape by using appropriate die members. In addition, these metal hydride compacts will have a generally uniform and high density so that they can be used as a solid fuel grain.

As shown in FIGURE 5, the compacts 52 are stacked one on top of the other in housing 54 in a rocket 56 to form the fuel grain 57. The opening 53 in each compact are in alignment and form thereby a combustion chamber 55 extending the length of the fuel grain.

A liquid oxidizer tank 58 is mounted in housing 54 as shown (see FIGURE 5). This tank may be pressurized or a liquid pump 59 may be connected to the housing to force the liquid oxidizer 60 through an injection plate 62 into the combustion chamber 55.

As seen, the injection plate communicates with opening or combustion chamber 55 in the fuel grain, and if the liquid oxidizer 60 in the fuel tank 58 is chlorine trifluoride, the fuel grain 59 and liquid oxidizer 60 will react spontaneously and violently.

The rocket exhaust nozzle 64 is secured to the housing 54 communicating with combustion chamber 55. With this arrangement, the combustion gases stream through the combustion chamber 55 and out nozzle 64 to provide thrust.

In some circumstances, it may be desirable to provide an additional igniter 66 for use in conditions where the action between the liquid oxidizer 60 and the fuel grain 52 may not occur spontaneously.

It is to be understood that the form of the invention herewith shown and described is to be taken as a preferred example of the same, and that various changes in the method herein described may be resorted to without departing from the spirit of this invention or the scope of the claims.

We claim:
1. A method of forming a solid fuel grain for a rocket from a powdered substance possessing relatively high latent combustive energy but of relatively low density, comprising the steps of inserting the powdered substance in a first female die member and pressing it there to preform the powdered substance to its approximate shape then inserting the preformed substance in a second female die member placed inside of a chamber, evacuating the chamber to substantially reduce the pressure therein below ambient pressure conditions exteriorly of the chamber, positioning a male die member inside the chamber in operative association with said second female die member, and explosively driving said male die member into said second female die member to compact the preformed substance to a solid high density body.

2. The method set forth in claim 1 wherein said powdered substance is a mixture of lithium and titanium hydride.

3. The method set forth in claim 1 wherein said powdered substance is a metal hydride mixed with powdered aluminum.

4. The method set forth in claim 1 wherein said powdered substance is a metal hydride mixed with powdered lead.

5. The method set forth in claim 1 wherein said powdered substance is lithium hydride.

6. The method set forth in claim 1 wherein said powdered substance is titanium hydride.

References Cited

UNITED STATES PATENTS

| | | | |
|---|---|---|---|
| 1,174,646 | 3/1916 | Williams | 75—214 |
| 1,371,671 | 3/1921 | Duryea et al. | 75—226 |
| 1,896,854 | 2/1933 | Taylor | 75—226 |
| 2,044,853 | 6/1936 | Laise | 75—214 |
| 2,818,339 | 12/1957 | Dodds | 75—225 |
| 2,942,298 | 6/1960 | Loedding | 264—3 |
| 2,948,923 | 8/1960 | Rocca et al. | 75—214 |
| 3,022,544 | 2/1962 | Coursen et al. | 75—214 |
| 3,185,018 | 6/1965 | Damon et al. | 264—3 |

L. DEWAYNE RUTLEDGE, *Primary Examiner.*